(12) United States Patent
Liu et al.

(10) Patent No.: US 7,839,092 B2
(45) Date of Patent: Nov. 23, 2010

(54) DRIVING SYSTEM HAVING CHANGEABLE OUTPUT PHASE

(75) Inventors: Ming-Hui Liu, Taoyuan Hsien (TW); Hen-Hsiang Huang, Taoyuan Hsien (TW)

(73) Assignee: FSP Technology Inc., Taoyuan Hsien (TW)

( * ) Notice: Subject to any disclaimer, the term of this patent is extended or adjusted under 35 U.S.C. 154(b) by 409 days.

(21) Appl. No.: 11/966,714

(22) Filed: Dec. 28, 2007

(65) Prior Publication Data
US 2009/0167082 A1   Jul. 2, 2009

(51) Int. Cl.
*H05B 39/04* (2006.01)
(52) U.S. Cl. ............ 315/194; 315/209 R; 315/307
(58) Field of Classification Search .......... 315/119, 315/121, 122, 123, 127, 128, 137, 141, 144, 315/147, 177, 185 R, 186, 189, 192, 193, 315/194, 195, 209 R, 210, 211, 212, 215, 315/216, 217, 219, 220, 221, 224, 225, 226, 315/246, 250, 254, 255, 256, 257, 268, 269, 315/274, 276, 277, 282, 287, 312, 313, 320, 315/324, 326, 354, 362, 291, 294, 295, 299–302, 315/307, 308
See application file for complete search history.

(56) References Cited

U.S. PATENT DOCUMENTS

2006/0076907 A1* 4/2006 Chen et al. ............ 315/312
2007/0159112 A1* 7/2007 Chang et al. ........... 315/195

FOREIGN PATENT DOCUMENTS

TW          M318876 U       9/2007

* cited by examiner

*Primary Examiner*—Douglas W Owens
*Assistant Examiner*—Jianzi Chen
(74) *Attorney, Agent, or Firm*—Muncy, Geissler, Olds & Lowe, PLLC

(57) ABSTRACT

A driving system with a changeable output phase includes a PWM unit to generate a duty cycle signal, a first driving unit, a second driving unit, a first transformer and a second transformer. The first driving unit and the second driving unit receive an input power and the duty cycle signal to drive respectively the first transformer and the second transformer to transform the input power to a first driving power and a second driving power. At least one of the first driving unit and the second driving unit is connected to a power phase control unit which generates a phase switching signal to modulate the driving phase of the connecting driving unit so that the first driving power and the second driving power output from the first and second transformers have a same or different phase to drive loads at the rear end.

7 Claims, 5 Drawing Sheets

DRIVING SYSTEM HAVING CHANGEABLE OUTPUT PHASE

FIELD OF THE INVENTION

The present invention relates to a driving system that has a changeable output phase and particularly to a driving system used on electric power transformation to drive a display device.

BACKGROUND OF THE INVENTION

The conventional LCD generally includes elements such as a polarization plate, a polyamide film, liquid crystals and a backlight module which generates light. The backlight module requires an inverter to generate steady electric power to enable the backlight module to function steadily for a longer duration. The power quality generated by the inverter has great impact to the performance and life span of the backlight module. One of pending issues for the LCD yet to be resolved is ripple images formed on the displaying picture. It is caused by electromagnetic interference and duty frequency and the like, and can be mostly improved by adjusting the backlight module (namely adjusting the driving power output from the inverter). The conventional inverter includes a power source, a pulse-width modulation (PWM) unit, a voltage transformation unit, a plurality of switches and a plurality of loads connecting to the secondary side of the voltage transformation unit. The voltage transformation unit includes a plurality of transformers to receive an input power from the power source and transform to a driving power to drive the loads. The PWM unit generates a duty cycle signal. The switches receive the duty cycle signal and switch to go through time series of the transformers so that the transformers generate driving power with the same or inverse phases. In the conventional circuit set forth above the ON sequence of the switches are set during circuit design, thus the power phase of the driving power generated by the transformers also is fixed. Reference of such a structure can be found in R.O.C. patent No. M318876 entitled "Driving apparatus for coupling lamps". It has a fixed phase for the driving power. Although it offers the benefit of easier synchronization, the phase of the driving power cannot be adjusted. In the event that ripple images are formed on a driven LCD, remedying this problem by adjusting the phase of the driving power is not possible. The inverter also cannot adjust the phase of the driving power. Hence other factors such as frequency of the driving power and the like have to be regulated to do improvement of the ripple images on the LCD. As a result operation scope of the LCD is constrained. Prohibiting the ripple images on the LCD is more difficult. There is still room for improvement.

SUMMARY OF THE INVENTION

In view of the problem occurred to the conventional inverter that cannot adjust the phase of output power the primary object of the present invention is to provide an inverter that is capable of delivering multiple driving power to drive a plurality of loads, and the phase of the driving power is changeable so that more adjustment means are available to improve the ripple images on the LCD.

The driving system with a changeable output phase according to the invention includes a PWM unit to generate a duty cycle signal, a first driving unit, a second driving unit, a first transformer and a second transformer. The first driving unit and the second driving unit receive an input power and the duty cycle signal to drive respectively the first transformer and the second transformer that transform the input power to a first driving power and a second driving power. At least one of the first driving unit and the second driving unit is connected to a power phase control unit which generates a phase switching signal to modulate the driving phase of the connecting driving unit so that the first driving power and the second driving power have a same or different phase to drive loads at a rear end. And a phase difference between the first driving power and the second driving power can be adjusted as desired.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
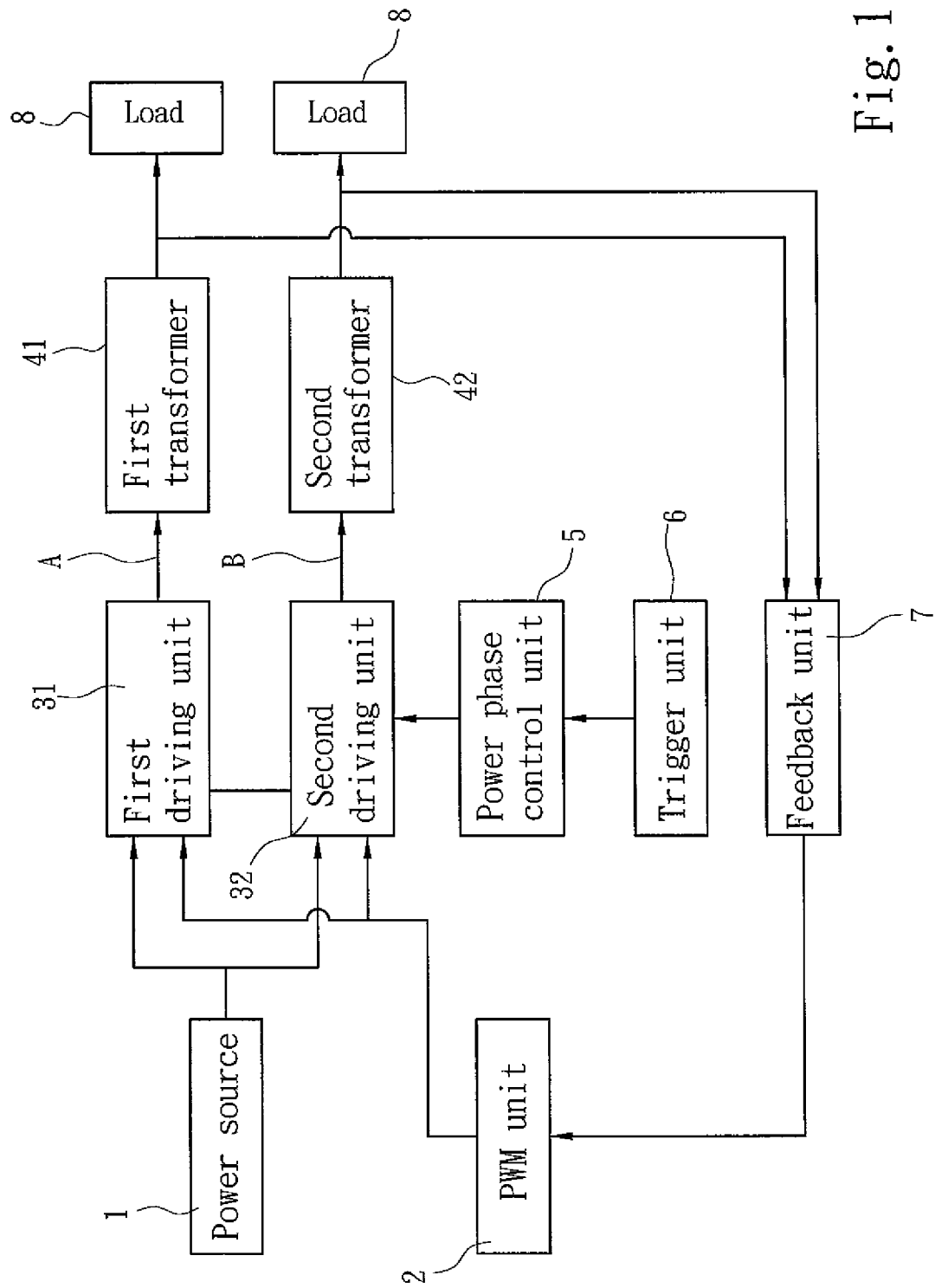
FIG. 1 is a structural block diagram of the invention.

Please refer to FIG. 1 for an embodiment of the invention. The driving system with changeable output phase of the invention includes a PWM unit 2 to generate a duty cycle signal, a first driving unit 31, a second driving unit 32, a first transformer 41 and a second transformer 42. The first driving unit 31 and the second driving unit 32 receive an input power from a power source 1 and the duty cycle signal to drive respectively the first transformer 41 and the second transformer 42 to transform the input power to a first driving power and a second driving power to drive respectively a load 8 at a rear end. The first transformer 41 and the second transformer 42 have respectively an output end connecting to a feedback unit 7 which generates a feedback signal to regulate the duty cycle signal generated by the PWM unit 2. The driving system further has a power phase control unit 5 which is connected to at least one of the first driving unit 31 and the second driving unit 32. The power phase control unit 5 generates a phase switching signal to modulate the driving phase of the connecting driving unit so that the first driving power and the second driving power have a same or different phase to drive the loads 8 at the rear end. In the embodiment shown in FIG. 1 the power phase control unit 5 is connected to the second driving unit 32. The generated phase switching signal makes the second driving unit 32 to drive the second transformer 42 to output the second driving power with an altered phase so that the second driving power and the first driving power have the same or different phase. Operation of the power phase control unit 5 is triggered by a trigger unit 6 which may be a single throw switch or pushbutton, or a rotary knob to control the trigger unit 6 to actuate the power phase control unit 5 to make phase alteration of the second driving power, thereby phase difference between the first driving power and the second driving power can be regulated as desired.

Figure 2:
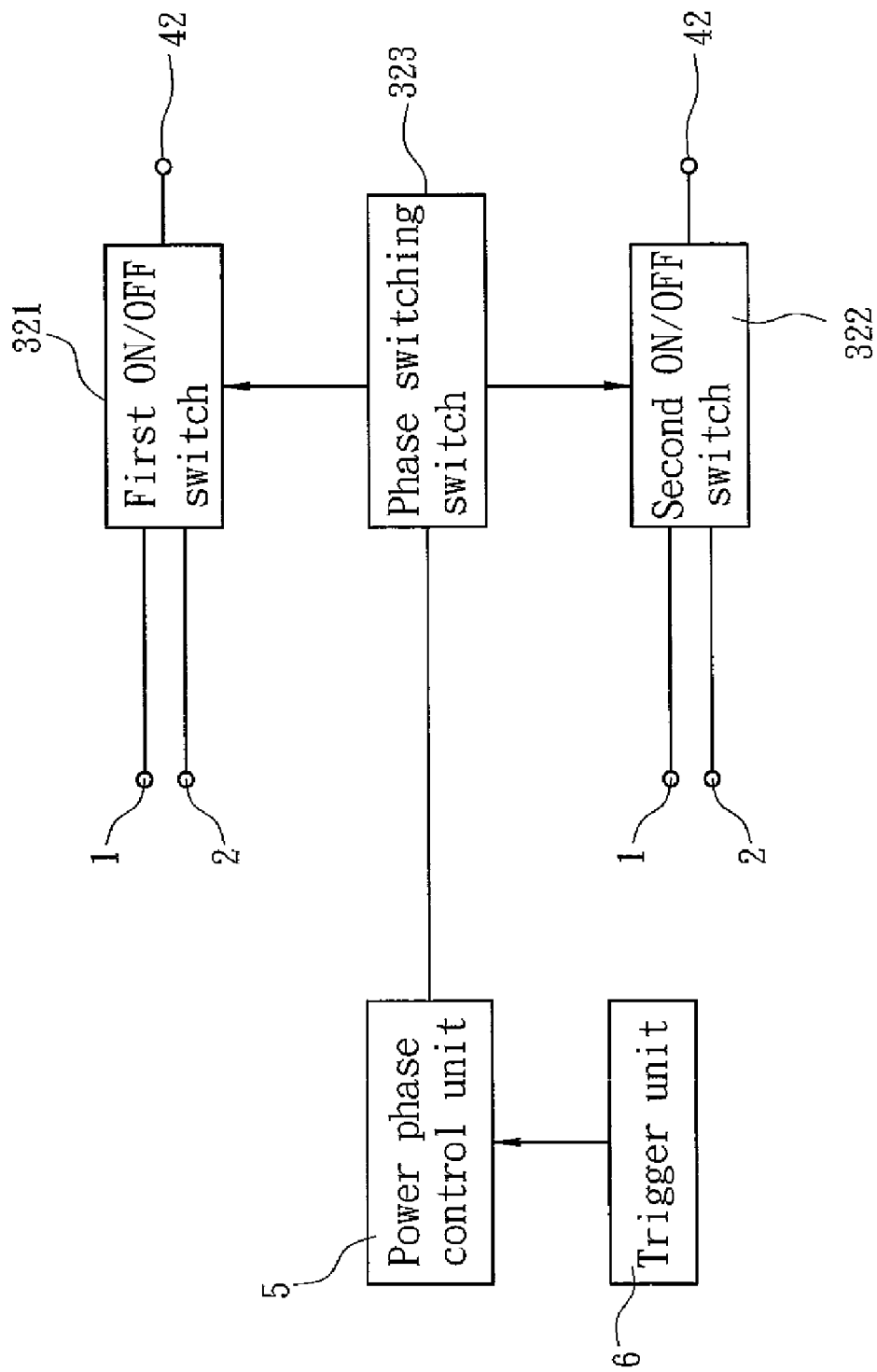
FIG. 2 is a structural block diagram of the second driving unit.

Referring to FIG. 2, the second driving unit 32 includes a first ON/OFF switch 321 and a second ON/OFF switch 322 which has a phase difference with the power ON time series of the first ON/OFF switch 321, and a phase switching switch 323 connecting to the first ON/OFF switch 321 and the second ON/OFF switch 322. The first and second ON/OFF switches 321 and 322 are connected to the power source 1 and PWM unit 2 to receive the input power and duty cycle signal. The power phase control unit 5 is connected to the phase switching switch 323 of the second driving unit 32 to send the phase switching signal to the phase switching switch 323. The phase switching switch 323 is driven by the phase switching signal to determine whether to connect the first ON/OFF switch 321 or the second ON/OFF switch 322. As there is a phase difference on the ON time series of the first and second ON/OFF switches 321 and 322, the driving power generated by the second transformer 42 has an altered phase due to alternated ON of the first and second ON/OFF switches 321 and 322. The first ON/OFF switch 321 may be connected to the second transformer 42 in an inverse direction relative to the second ON/OFF switch 322 to achieve the phase difference of ON time series between the first and second ON/OFF switches 321 and 322.

Figure 3:
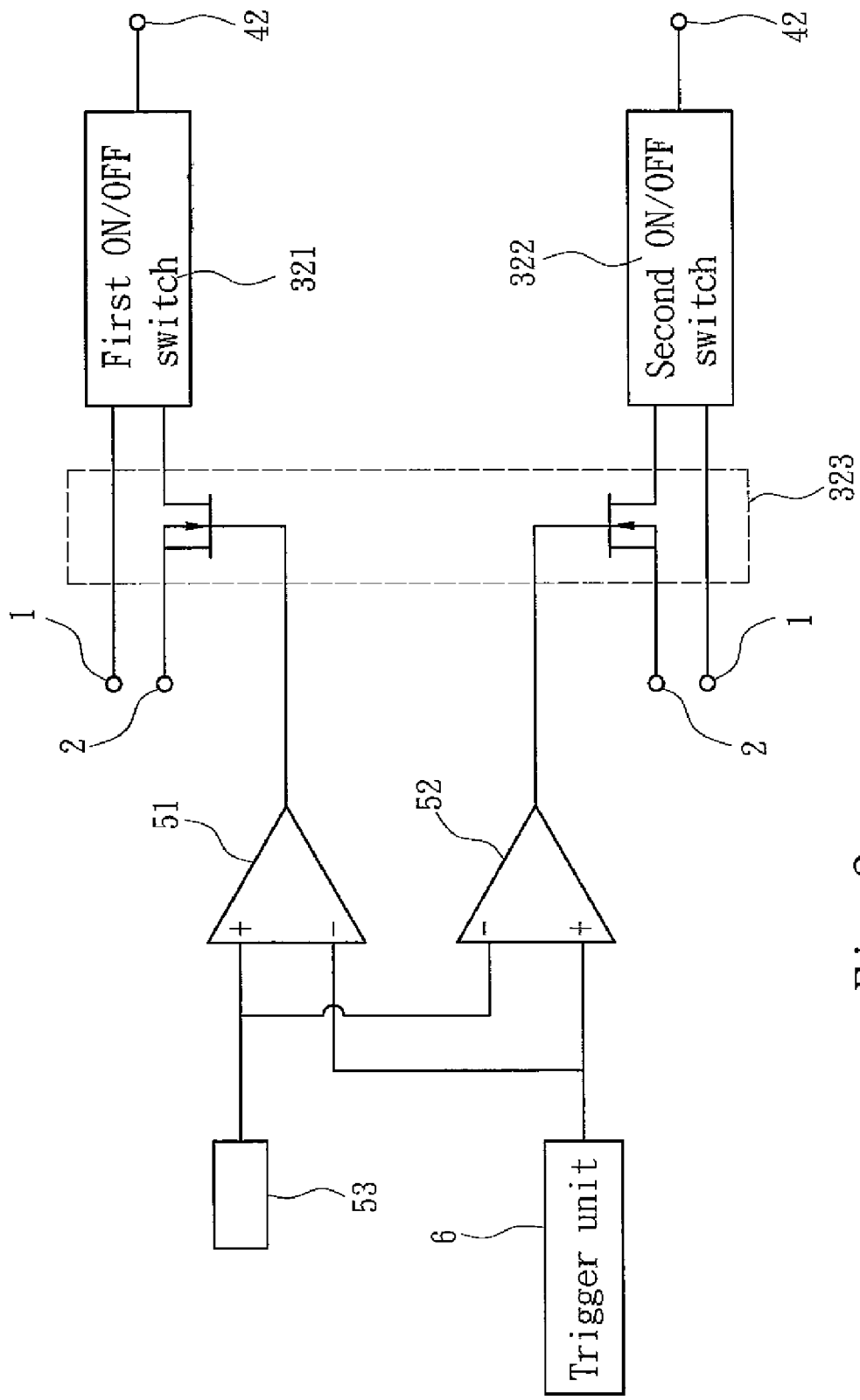
FIG. 3 is a schematic view of an embodiment of the phase switching switch.

In the embodiment set forth above, the phase switching switch 323 controls a circuit which sends the input power or duty cycle signal to the first and second ON/OFF switches 321 and 322. Sending or cutoff of the input power or duty cycle signal to the first or second ON/OFF switch 321 or 322 is determined by the phase switching signal. Refer to FIG. 3 for an embodiment of the phase switching unit 323. The phase switching switch 323 includes two switch elements located on the circuit for transmitting the input power to the first and second ON/OFF switches 321 and 322. The power phase control unit 5 may include a first comparator 51, a second comparator 52 and a reference voltage source 53 to provide a reference voltage. The first comparator 51 has a positive input end connecting to the reference voltage source 53 and a negative input connecting to the trigger unit 6. The second comparator 52 has a negative input end connecting to the reference voltage source 53 and a positive input end connecting to the trigger unit 6. The voltages of the reference voltage and the trigger unit 6 are compared to generate the phase switching signal. According to the phase switching signal whether the phase switching switch 323 is connected to the first ON/OFF switch 321 or the second ON/OFF switch 322 is determined so that an alternated ON condition of the first and second ON/OFF switches 321 and 322 is formed. Thereby the phase of the second driving power is altered. The two switch elements of the phase switching switch 323 may also be located on the circuit for transmitting the duty cycle signal to the first ON/OFF switch 321 or the second ON/OFF switch 322 to select either the first ON/OFF switch 321 or the second ON/OFF switch 322 to receive the duty cycle signal to perform duty. The power phase control unit 5 may also use a single comparator to compare the voltages of the reference voltage source 53 and the trigger unit 6. The phase switching switch 323 must include an inverter connecting to the first ON/OFF switch 321 or second ON/OFF switch 322 to convert the phase switching signal to an ON signal and an OFF signal to set the first ON/OFF switch 321 and the second ON/OFF switch 322 ON or OFF. The alternated ON/OFF switching technique of the first and second ON/OFF switches 321 and 322 is known in the art, details are omitted herein.

Figure 4:
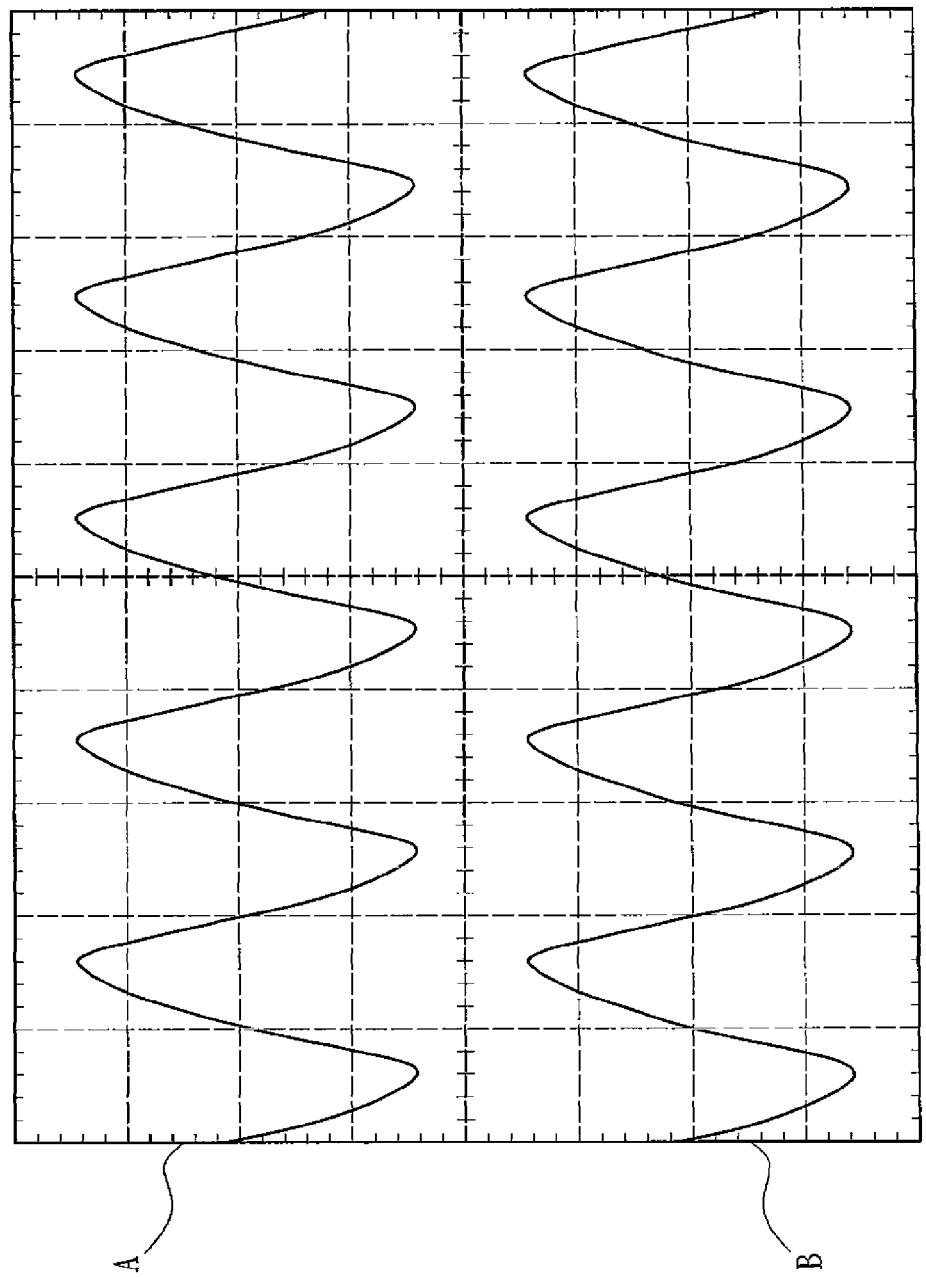
FIG. 4 is an output waveform chart of the first driving unit and the second driving unit.
Figure 5:
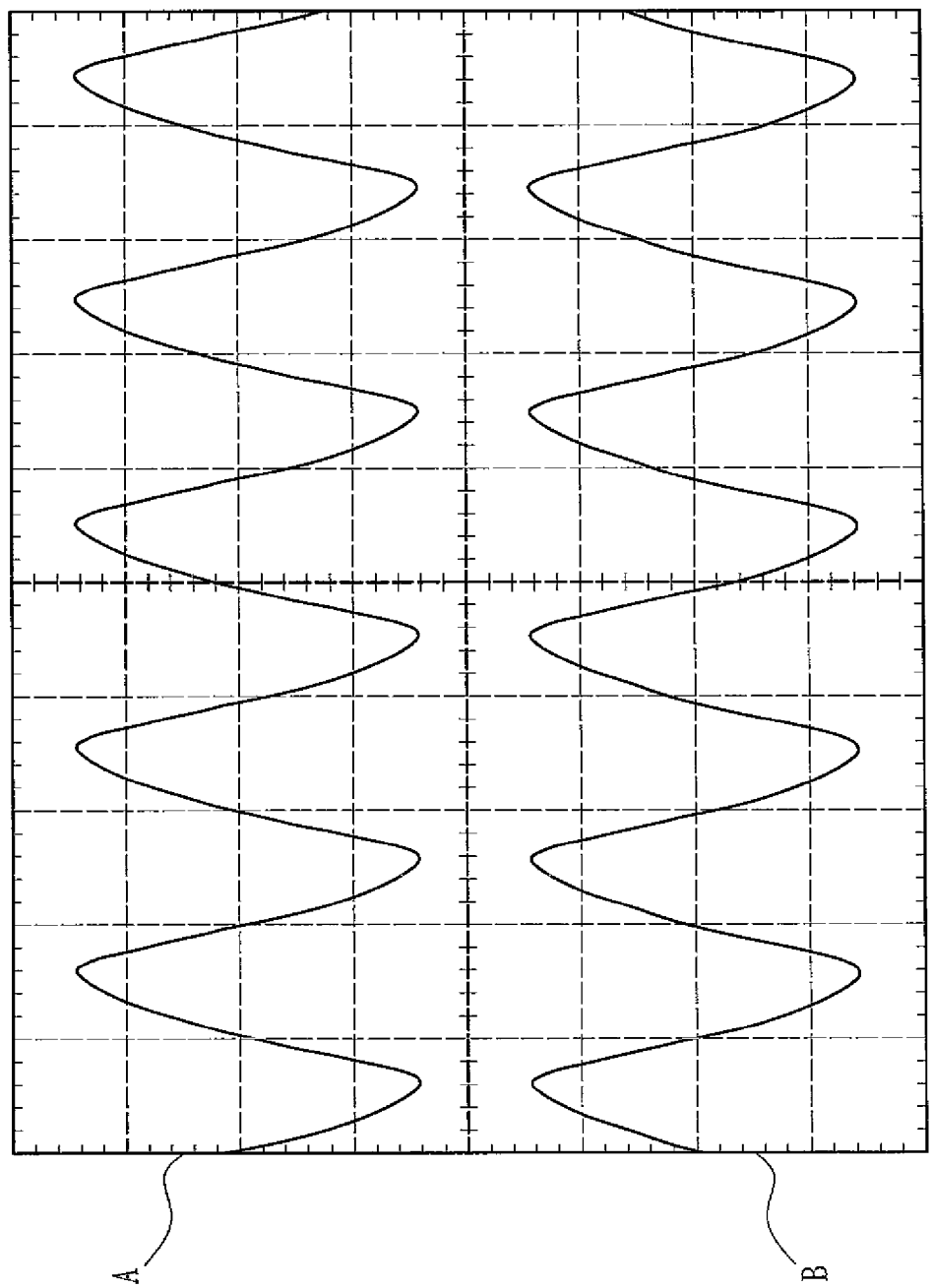
FIG. 5 is another output waveform chart of the first driving unit and the second driving unit.

Refer to FIGS. 1, 4 and 5 for the waveforms of the embodiment previously discussed. The first and second driving units 31 and 32 output respectively a signal A and signal B at the rear end thereof. The waveforms of the signals A and B are shown in FIGS. 4 and 5. The signal A is for the first driving power with a fixed phase, while the signal B is for the second driving power. When the first ON/OFF switch 321 of the second driving unit 32 is ON and generates current, the phase of the second driving power is the same as the first driving power as shown in FIG. 4, and the trigger unit 6 triggers the power phase control unit 5 to output the phase switching signal to alter the phase of the second driving power so that a phase difference is formed for the second driving power and the first driving power (referring to FIG. 5). Therefore the object of the invention is accomplished.

The first and second ON/OFF switches 321 and 322 in the embodiments previously discussed may be half-bridge resonant circuits or full-bridge resonant circuits. The first driving unit 31 also is a corresponding half-bridge resonant circuit or full-bridge resonant circuit. The second and first driving units 32 and 31 may also be push-pull switch circuits. The load 8 is a lamp set consisting of at least one discharged lamp. The power phase control unit 5 may also be connected to the first driving unit 31 or connecting to the two driving units at the same time to expand the phase modulation scope of the driving power.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A driving system having changeable output phase comprising a pulse-width modulation (PWM) unit to generate a duty cycle signal, a first driving unit and a second driving unit to receive the duty cycle signal, and a first transformer and a second transformer driven respectively by the first driving unit and the second driving unit to transform an input power to a first driving power and a second driving power to drive loads at a rear end, wherein:
    at least one of the first driving unit and the second driving unit is connected to a power phase control unit which generates a phase switching signal to modulate driving phase of the connected driving unit such that the first driving power and the second driving power have a same or different phase to drive the loads at the rear end;
    the power phase control unit is triggered by a trigger unit; and
    the power phase control unit connected to the driving unit includes a first comparator, a second comparator and a reference voltage source to provide a reference voltage, the first comparator having a first positive input end connecting to the reference voltage source and a first negative input end connecting to the trigger unit, the second comparator having a second negative input end connecting to the reference voltage source and a second positive input end connecting to the trigger unit, the phase switching signal being generated by comparing the reference voltage with the voltage of the trigger unit.

2. The driving system of claim 1, wherein the driving unit connected to the power phase control unit includes a first ON/OFF switch, a second ON/OFF switch which has a phase difference with the time series of the first ON/OFF switch in an ON condition and a phase switching switch connecting to the first ON/OFF switch and the second ON/OFF switch, the phase switching switch being driven by the phase switching signal to determine which of the first ON/OFF switch and the second ON/OFF switch to be set ON.

3. The driving system of claim 2, wherein the first ON/OFF switch and the second ON/OFF switch are selectively half-bridge resonant circuits or full bridge resonant circuits, or push-pull switch circuits.

4. The driving system of claim 2, wherein the phase switching switch has two switch elements located respectively on a circuit to send the input power or the duty cycle signal to the first ON/OFF switch and the second ON/OFF switch, sending or stop sending of the input power or the duty cycle signal to the first ON/OFF switch or the second ON/OFF switch being determined by the phase switching signal.

5. The driving system of claim 4, wherein the phase switching switch further has an inverter connecting to the first ON/OFF switch or the second ON/OFF switch to convert the phase switching signal to an ON signal and an OFF signal to set the first ON/OFF switch and the second ON/OFF switch ON or OFF.

6. The driving system of claim 1, wherein the trigger unit is a single throw switch, a pushbutton or a rotary knob.

7. The driving system of claim 1, wherein the loads are a lamp set consisting of at least one discharged lamp.

\* \* \* \* \*